United States Patent [19]

Veneklase

[11] Patent Number: 4,463,436
[45] Date of Patent: Jul. 31, 1984

[54] PROGRAMMABLE DIGITAL TEMPERATURE CONTROLLER APPARATUS

[75] Inventor: Brian J. Veneklase, Vandalia, Ohio

[73] Assignee: The United States of America as represented by the Secretary of the Air Force, Washington, D.C.

[21] Appl. No.: 324,347

[22] Filed: Nov. 23, 1981

[51] Int. Cl.³ .................................................. G05D 23/00
[52] U.S. Cl. .................... 364/557; 377/25; 374/170
[58] Field of Search ........................ 364/557; 377/25; 374/170, 171

[56] References Cited

U.S. PATENT DOCUMENTS

| | | | |
|---|---|---|---|
| 4,198,676 | 4/1980 | Varnum et al. | 364/557 |
| 4,234,927 | 11/1980 | First | 364/557 |
| 4,274,145 | 6/1981 | Hendricks et al. | 364/557 |
| 4,370,731 | 1/1983 | Sasaki et al. | 364/557 |

*Primary Examiner*—Gary Chin
*Attorney, Agent, or Firm*—Donald J. Singer; William Stepanishen

[57] ABSTRACT

A programmable digital temperature controller apparatus utilizing a pair of binary-coded decimal units and a switching unit to generate a ten bit binary word which represents a pre-selected temperature in a temperature range. A pair of erasable programmable read only memory units store digital temperatures and temperature range information. The ten bit binary word determines which digital data from the memory units will be applied to a D/A converter unit and a pair of multiplexer units. One multiplexer unit controls the voltage per bit within the D/A converter unit while the other multiplexer unit generates a starting voltage. The output voltage from the D/A converter unit and the starting voltage are summed together to provide a voltage output signal which represent the pre-selected temperature.

6 Claims, 6 Drawing Figures

PROGRAMMABLE DIGITAL TEMPERATURE CONTROLLER APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to a temperature control apparatus and in particular to a programmable digital temperature controller apparatus.

Automatic temperature control requires a feedback control system in which the controlled variable is the magnitude of the temperature. In many chemical, petrochemical, metallurgical, and physical processes and reactions, temperature is very critical and is carefully controlled. Temperature controllers are by far the largest single group of control devices. The temperature controller is usually set to maintain a constant temperature in the system, but there are also systems in which the temperature is made to follow some prescribed program.

In automatic temperature control systems the controlled temperature is measured by means of a temperature-measuring instrument whose output or reading is compared to a desired or reference setting. If a difference exists between the measured and desired temperature, a correction is applied to an actuator which increases or decreases the amount of heat supplied to the process. The actuator controls the flow of a heated fluid such as water, oil, a molten metal, steam, vapor, or heated gases into a heat exchanger.

An important component in temperature control systems is the element which measures the temperature at the place in the process at which control is to be applied. This device, known as a temperature transducer, converts the temperature into some other quantity, such as a mechanical movement pressure, or electric voltage. This signal can be processed in a controller and applied to the actuator which controls the heat to the system.

Temperature transducers that produce mechanical movement are based on the difference in thermal expansion of two dissimilar metals. These are called lametallic thermometers. Pressure-type transducers employ a closed fluid system in which a bulb is filled with a liquid or gas. A capillary tube transmits the pressure in a conventional distant point, and a pressure expansive element, such as bellows or diaphragm, converts the pressure into mechanical movement. Electrical transducers are either of the resistance or thermocouple type. In the former, the change of resistance of a metal strip is measured in a bridge circuit. A deviation from the reference value produces a proportional signal voltage. The thermocouple type consists of two wires of different metals brazed or welded together at a junction. By placing two such junctions in series, one at a hot point and the other at a cold point, a voltage is developed which is proportional to the temperature difference between the two points.

It is of primary importance in many heating applications such as home heating or cooking that the temperature when the heat be applied in a controlled manner and that a pre-selected temperature be maintained. Once a preselected maximum temperature has been reached it is equally important, as determined by the characteristics of the heat generating appliance, that the temperature be maintained within definite predetermined limits. Large fluctuations in temperature from the preselected maximum temperature impairs the efficiency of the heating application as well as shorten the life expectancy of the heating appliance. Furthermore, uncontrolled applications of heat that vary over large time and temperature cycles result in a considerable increase in power consumption in order to maintain a given average temperature. The present invention overcomes these prior art shortcomings.

SUMMARY OF THE INVENTION

The present invention utilizes binary-coded decimal logic circuits to change a decimal temperature number into a digital code that is simultaneously applied to a pair of erasable programmable read only memory (EPROM) units. The EPROM units store digital words representing one of a plurality of temperature values for a given temperature range. One of the EPROM units applies a digital word to a D/A converter unit wherein an analog voltage is generated that represents a portion of the selected temperature. A pair of multiplexer units receive a digital word from the second EPROM unit. The multiplexers respectively control the voltage per bit in the D/A converter unit and provide starting voltage to an analog summer unit. The summer unit sums the voltage output from the D/A converter unit with the starting voltage to provide an output voltage signal that represents the selected temperature.

It is one object of the present invention, therefore to provide an improved programmable digital temperature controller apparatus.

It is another object of the invention to provide an improved programmable digital temperature controller apparatus utilizing a D/A in conjunction with erasable programmable read only memory unit to produce reprogrammable, variable slopes.

It is another another object of the invention to provide an improved programmable digital temperature controller apparatus utilizing number sets which follow a two dimensional graph having either voltage or current as one axis.

It is another object of the invention to provide an improved programmable digital temperature controller apparatus utilizing the use of multiplexers as voltage selectors to accept binary bits from an erasable programmable read only memory unit to automatically range a D/A converter.

It is another object of the invention to provide an improved programmable digital temperature controller apparatus to provide starting voltages representing starting points on a two dimensional graph.

It is another object of the invention to provide an improved programmable digital temperature controller apparatus, the overall ability of the invention to accept binary inputs and convert the information into an analog controller with ease of reprogrammability.

It is still another object of the invention to provide an apparatus which is economical to produce and utilizes conventional, currently available components that lend themselves to standard mass production manufacturing techniques.

These and other advantages, objects and features of the invention will become more apparent from the following description taken in connection with the illustrative embodiments in the accompanying drawings.

DESCRIPTION OF THE DRAWING

Figure 1:
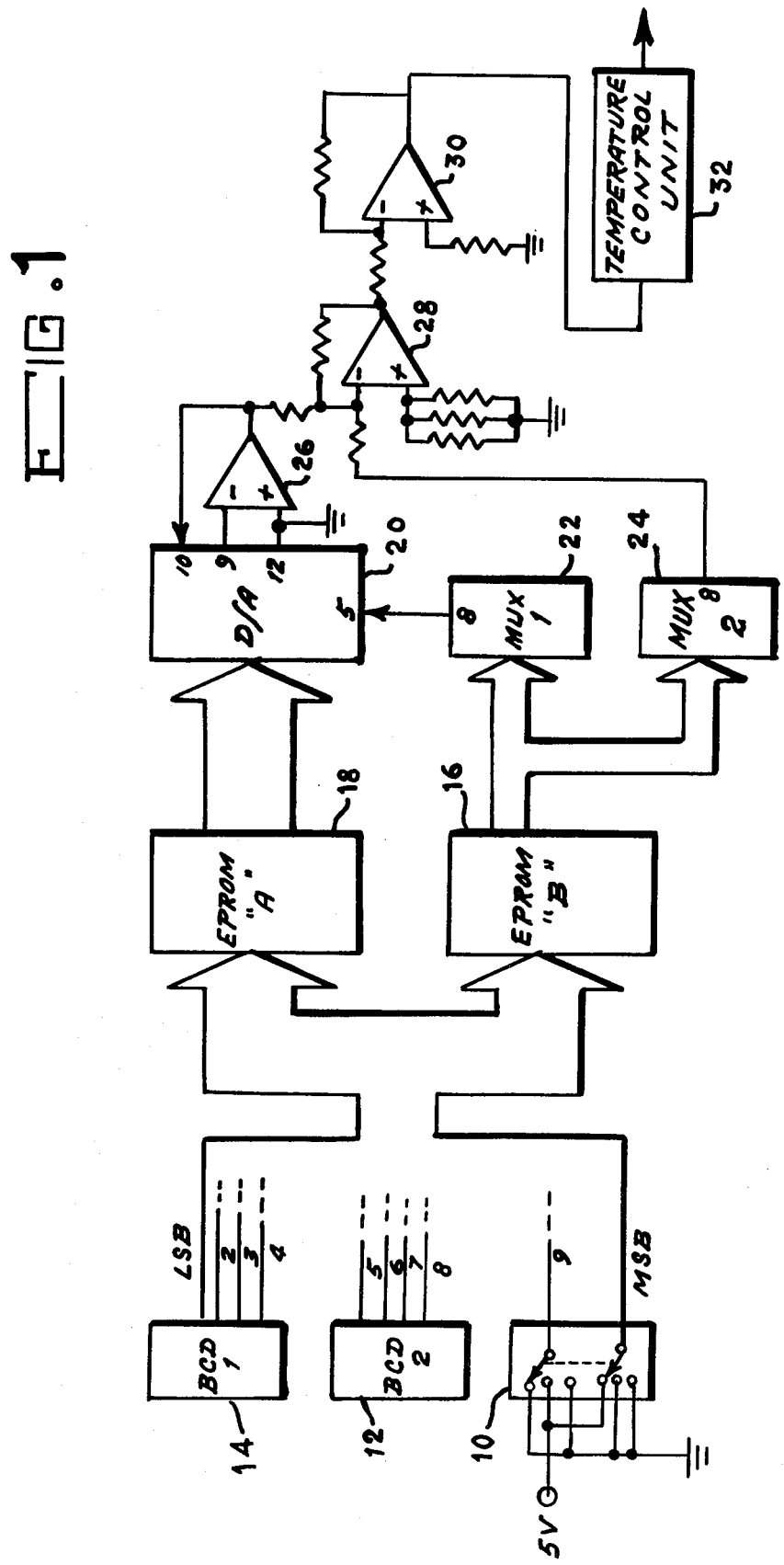
FIG. 1 is a block diagram of the programmable digital temperature controller apparatus according to the present invention.

Referring now to FIG. 1, there is shown a block diagram of the programmable digital temperature controller apparatus utilizing a three-position two wafer switch 10 and a pair of binary coded decimal units 12, 14. The switch unit 10 and the binary-coded decimal (BCD) units 12, 14 are utilized to insert a desired temperature number into the digital temperature controller apparatus. For example, temperatures in the range of −60° C. and 150° C. may be inputted into the temperature controller through the three switch positions, which are available on switch unit 10 and the thumbwheel switches (not shown) that are part of the binary-coded decimal units 12, 14. The three position switch unit 10 provides the controller apparatus with the range the temperature that is selected, since it is possible for a number to appear three times, e.g. −10, +10 and 110. Therefore depending upon the temperature range sought, the internal bits which are generated by the switch unit 10, appear as either 00, 01, or 10. The next two numbers of the selected temperatures are coded as two sets of BCD code which represent the second and third place digits of the temperature number.

The binary output signals from the switch unit 10 and the binary-coded decimal units 12, 14 are applied to the inputs of a pair of erasable programmable read only memory (EPROM) units 16, 18. There is stored in the EPROM-A unit 18, the binary words which represent temperature sequences within the temperature range of the controller apparatus. There is stored in the EPROM-B unit 16, the binary words for controlling the voltage per bit level in the D/A converter unit 20 and the starting voltage of a given temperature range which is applied through multiplexer 24 to operational amplifier unit 28. The binary input codes to the EPROM units 16, 18 are memory address locations within the memories in which the binary control words are stored. Once a memory address is received by the EPROM units 16, 18, the binary information in that location is transferred respectively to the D/A converter unit 20 and the multiplexer units 22, 24. There is shown in Tables I and II the programming of the EPROM units 16, 18, wherein columns 1 through 10 are memory addresses and the binary data stored in the memory is the remainder.

TABLE I EPROM - A

|  | 1234567890 | 12345678 |  | 1234567890 | 12345678 |
|---|---|---|---|---|---|
| 1.0000 | 0000000000 | 11111111 | 23.0000 | 0000010110 | 00011000 |
| 2.0000 | 0000000001 | 00100111 | 24.0000 | 0000010111 | 00010111 |
| 3.0000 | 0000000010 | 00100110 | 25.0000 | 0000011000 | 00010110 |
| 4.0000 | 0000000011 | 00100101 |  |  |  |
| 5.0000 | 0000000100 | 00100100 | 26.0000 | 0000011001 | 00010101 |
|  |  |  | 27.0000 | 0000011010 | 11111111 |
| 6.0000 | 0000000101 | 00100011 | 28.0000 | 0000011011 | 11111111 |
| 7.0000 | 0000000110 | 00100010 | 29.0000 | 0000011100 | 11111111 |
| 8.0000 | 0000000111 | 00100001 | 30.0000 | 0000011101 | 11111111 |
| 9.0000 | 0000001000 | 00100000 |  |  |  |
| 10.0000 | 0000001001 | 00011111 | 31.0000 | 0000011110 | 11111111 |
|  |  |  | 32.0000 | 0000011111 | 11111111 |
| 11.0000 | 0000001010 | 11111111 | 33.0000 | 0000100000 | 00010100 |
| 12.0000 | 0000001011 | 11111111 | 34.0000 | 0000100001 | 00010011 |
| 13.0000 | 0000001100 | 11111111 | 35.0000 | 0000100010 | 00010010 |
| 14.0000 | 0000001101 | 11111111 |  |  |  |
| 15.0000 | 0000001110 | 11111111 | 36.0000 | 0000100011 | 00010001 |
|  |  |  | 37.0000 | 0000100100 | 00010000 |
| 16.0000 | 0000001111 | 11111111 | 38.0000 | 0000100101 | 00001111 |
| 17.0000 | 0000010000 | 00011110 | 39.0000 | 0000100110 | 00001110 |
| 18.0000 | 0000010001 | 00011101 | 40.0000 | 0000100111 | 00001101 |
| 19.0000 | 0000010010 | 00011100 |  |  |  |
| 20.0000 | 0000010011 | 00011011 | 41.0000 | 0000101000 | 00001100 |
|  |  |  | 42.0000 | 0000101001 | 00001011 |
| 21.0000 | 0000010100 | 00011010 | 43.0000 | 0000101010 | 11111111 |
| 22.0000 | 0000010101 | 00011001 | 44.0000 | 0000101011 | 11111111 |

```
45.0000    0000101100 11111111
46.0000    0000101101 11111111
47.0000    0000101110 11111111

48.0000    0000101111 11111111
49.0000    0000110000 00001010
50.0000    0000110001 00001001
51.0000    0000110010 00001000
52.0000    0000110011 00000111

53.0000    0000110100 00000110
54.0000    0000110101 00000101
55.0000    0000110110 00000100
56.0000    0000110111 00000011
57.0000    0000111000 00000010

58.0000    0000111001 00000001
59.0000    0000111010 11111111
60.0000    0000111011 11111111
61.0000    0000111100 11111111
62.0000    0000111101 11111111

63.0000    0000111110 11111111
64.0000    0000111111 11111111
65.0000    0001000000 00000000
66.0000    0001000001 00010011
67.0000    0001000010 00010010

68.0000    0001000011 00010001
69.0000    0001000100 00010000
70.0000    0001000101 00001111
71.0000    0001000110 00001110
72.0000    0001000111 00001101

73.0000    0001001000 00001100
74.0000    0001001001 00001011
75.0000    0001001010 11111111
76.0000    0001001011 11111111
77.0000    0001001100 11111111

78.0000    0001001101 11111111
79.0000    0001001110 11111111
80.0000    0001001111 11111111
81.0000    0001010000 00001010
82.0000    0001010001 00001001

83.0000    0001010010 00001000
84.0000    0001010011 00000111

TABLE II EPROM - B 12 3456 7890 12345678

1. 0000    00 0000 0000 11111111
2. 0000    00 0000 0001 00111111
3. 0000    00 0000 0010 00111111
4. 0000    00 0000 0011 00111111
5. 0000    00 0000 0100 00111111
6. 0000    00 0000 0101 00111111
7. 0000    00 0000 0110 00111111
8. 0000    00 0000 0111 00111111
9. 0000    00 0000 1000 00111111
10. 0000   00 0000 1001 00111111

11. 0000   00 0000 1010 11111111
12. 0000   00 0000 1011 11111111
13. 0000   00 0000 1100 11111111
14. 0000   00 0000 1101 11111111
15. 0000   00 0000 1110 11111111
16. 0000   00 0000 1111 11111111
17. 0000   00 0001 0000 00111111
18. 0000   00 0001 0001 00111111
19. 0000   00 0001 0010 00111111
20. 0000   00 0001 0011 00111111

21. 0000   00 0001 0100 00111111
22. 0000   00 0001 0101 00111111
23. 0000   00 0001 0110 00111111
24. 0000   00 0001 0111 00111111
25. 0000   00 0001 1000 00111111
26. 0000   00 0001 1001 00111111
27. 0000   00 0001 1010 11111111
28. 0000   00 0001 1011 11111111
29. 0000   00 0001 1100 11111111
30. 0000   00 0001 1101 11111111

31. 0000   00 0001 1110 11111111
32. 0000   00 0001 1111 11111111
33. 0000   00 0010 0000 00111111
34. 0000   00 0010 0001 00111111
35. 0000   00 0010 0010 00111111
36. 0000   00 0010 0011 00111111
37. 0000   00 0010 0100 00111111
38. 0000   00 0010 0101 00111111
39. 0000   00 0010 0110 00111111
40. 0000   00 0010 0111 00111111

41. 0000   00 0010 1000 00111111
42. 0000   00 0010 1001 00111111
43. 0000   00 0010 1010 11111111
44. 0000   00 0010 1011 11111111
45. 0000   00 0010 1100 11111111
46. 0000   00 0010 1101 11111111
47. 0000   00 0010 1110 11111111
48. 0000   00 0010 1111 11111111
49. 0000   00 0011 0000 00111111
50. 0000   00 0011 0001 00111111

51. 0000   00 0011 0010 00111111
52. 0000   00 0011 0011 00111111
53. 0000   00 0011 0100 00111111
54. 0000   00 0011 0101 00111111
55. 0000   00 0011 0110 00111111
56. 0000   00 0011 0111 00111111
57. 0000   00 0011 1000 00111111
58. 0000   00 0011 1001 00111111
```

| | | | |
|---|---|---|---|
| 59. 0000 | 00 | 0011 | 1010 11111111 |
| 60. 0000 | 00 | 0011 | 1011 11111111 |
| 61. 0000 | 00 | 0011 | 1100 11111111 |
| 62. 0000 | 00 | 0011 | 1101 11111111 |
| 63. 0000 | 00 | 0011 | 1110 11111111 |
| 64. 0000 | 00 | 0011 | 1111 11111111 |
| 65. 0000 | 00 | 0100 | 0000 00111111 |
| 66. 0000 | 00 | 0100 | 0001 00011111 |
| 67. 0000 | 00 | 0100 | 0010 00011111 |
| 68. 0000 | 00 | 0100 | 0011 00011111 |
| 69. 0000 | 00 | 0100 | 0100 00011111 |
| 70. 0000 | 00 | 0100 | 0101 00011111 |
| 71. 0000 | 00 | 0100 | 0110 00011111 |
| 72. 0000 | 00 | 0100 | 0111 00011111 |
| 73. 0000 | 00 | 0100 | 1000 00011111 |
| 74. 0000 | 00 | 0100 | 1001 00011111 |
| 75. 0000 | 00 | 0100 | 1010 11111111 |
| 76. 0000 | 00 | 0100 | 1011 11111111 |
| 77. 0000 | 00 | 0100 | 1100 11111111 |
| 78. 0000 | 00 | 0100 | 1101 11111111 |
| 79. 0000 | 00 | 0100 | 1110 11111111 |
| 80. 0000 | 00 | 0100 | 1111 11111111 |
| 81. 0000 | 00 | 0101 | 0000 00011111 |
| 82. 0000 | 00 | 0101 | 0001 00011111 |
| 83. 0000 | 00 | 0101 | 0010 00011111 |
| 84. 0000 | 00 | 0101 | 0011 00011111 |
| 85. 0000 | 00 | 0101 | 0100 00011111 |
| 86. 0000 | 00 | 0101 | 0101 00011111 |
| 87. 0000 | 00 | 0101 | 0110 00011111 |
| 88. 0000 | 00 | 0101 | 0111 00011111 |
| 89. 0000 | 00 | 0101 | 1000 00011111 |
| 90. 0000 | 00 | 0101 | 1001 00011111 |
| 91. 0000 | 00 | 0101 | 1010 11111111 |
| 92. 0000 | 00 | 0101 | 1011 11111111 |
| 93. 0000 | 00 | 0101 | 1100 11111111 |
| 94. 0000 | 00 | 0101 | 1101 11111111 |
| 95. 0000 | 00 | 0101 | 1110 11111111 |

The D/A converter unit 20 receives the binary data from the EPROM unit 18 and converts the binary data into an analog voltage signal which is applied to operational amplifier unit 26. The binary data from the EPROM unit 16 is respectively applied to multiplexer units 22, 24. The multiplexer unit 22 utilizes the received binary data to control the voltage per bit level in the D/A converter unit 20. The multiplexer unit 24 utilizes the received binary data to provide the starting voltage of a given temperature range to the differential input of operational amplifier unit 28. The output voltage from operational amplifier unit 26 is also applied to the differential input of operational amplifier unit 28 where it is summed with starting voltage from multiplexer unit 24. The output voltage from operational amplifier unit 28 is an analog voltage which represents the desired temperature number that was entered into the temperature controller apparatus by means of switch unit 10 and BCD units 12, 14. The output voltage from operational amplifier 28 is applied through operational amplifier unit 30 to a temperature control unit 32. The temperature control unit 32 responds to the applied voltage and adjusts the temperature setting.

Figure 2:
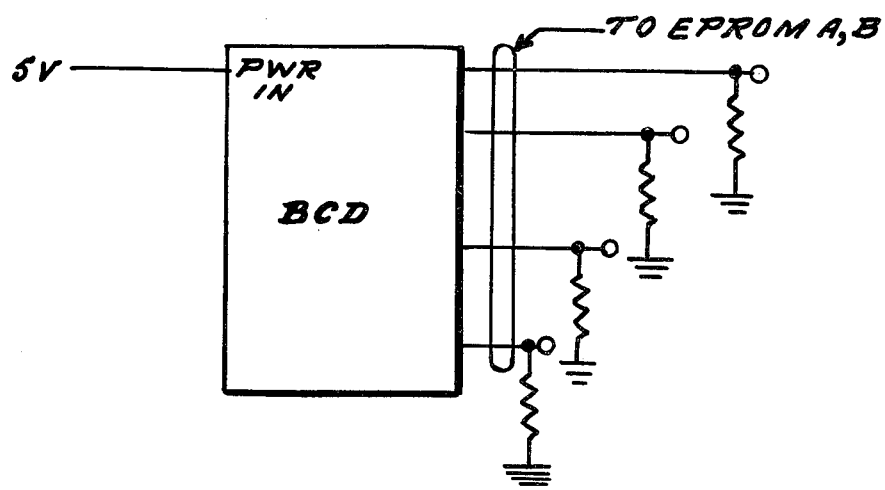
FIG. 2 is a block diagram of the binary coded decimal unit showing the power and output connections.

The programmable digital temperature controller apparatus as shown in FIG. 1 may be implemented through the use of the following commercially available components: EPROMs/TMS 2708s, Multiplexers/PMI MUX 08 AQ, D/A converter/AD 562, BCD/Cherry T75-02M, and the operational amplifiers which are standard 741 units. There is shown in FIG. 2 a block diagram of a binary-coded decimal unit wherein the power into the unit is connected to a five volt supply. The four output lines are tied through 22K resistors to ground. The binary-coded decimal units include thumb-wheel BCD switches which are utilized to code the binary bits on the output lines.

Figure 3:
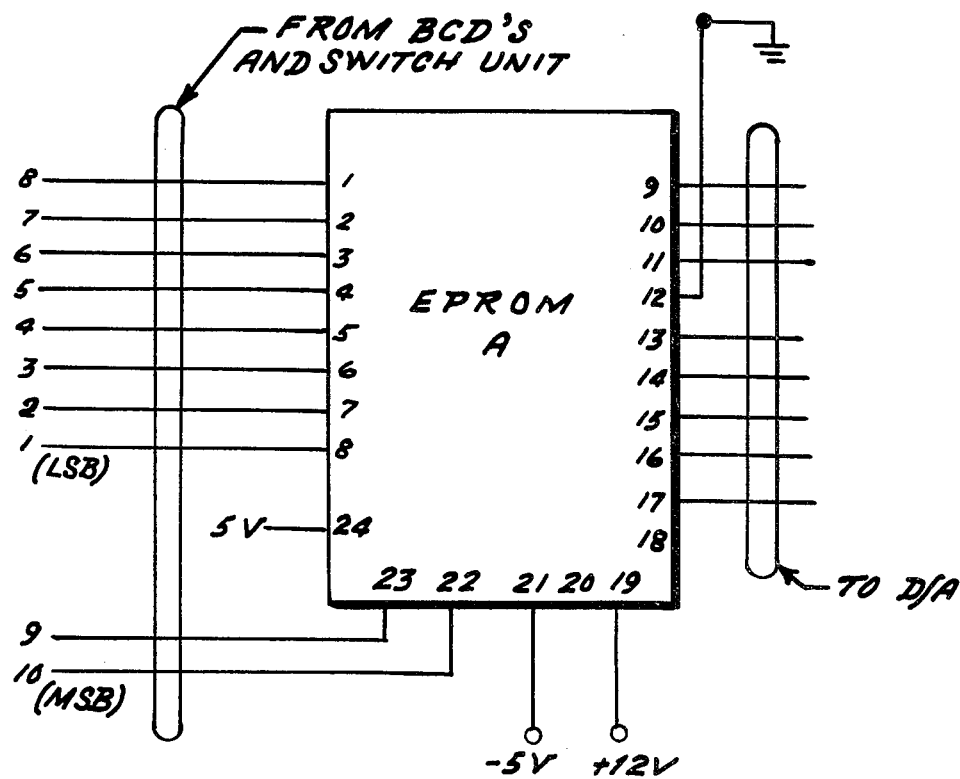
FIG. 3 is a block diagram of the EPROM A unit showing the input, output and power connections.
Figure 5:
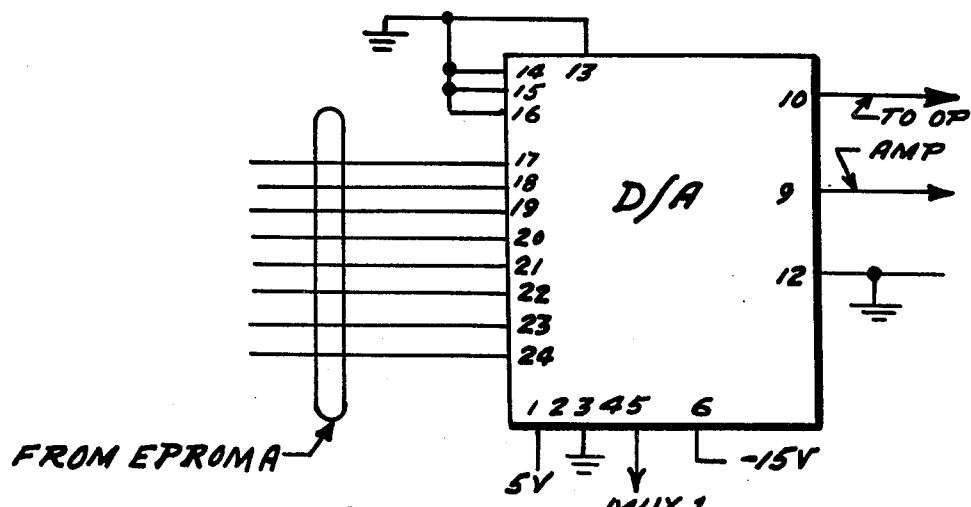
FIG. 5 is a block diagram of the D/A converter unit giving the input, output and power connections, and, FIG. 6 is a block diagram of the multiplexer units giving the input, output and power connections.

There is shown in FIG. 3, a block diagram of the EPROM A unit wherein the input power is applied to the specified pins in the following manner: pin 19=12 V, pin 21=−5 V, pin 24=5 V and pin 12=0 V. Input bits #1 through #10 from the input encoder unit is connected to EPROM A inputs at pin #'s 8, 7, 6, 5, 4, 3, 2, 1, 23, and 22 respectively. The output from the EPROM A unit are connected to the D/A converter which is shown in FIG. 5. The EPROM A output pins 17, 16, 15, 14, 13, 11, 10 and 9 are respectively connected to D/A input pins 24,23,22,21,20,19,18 and 17. Pins 16,15,14 and 13 of the D/A converter unit are grounded. The D/A converter unit is powered with −14 V at pin 6, 5 V at pin 1 and 0 V at pins 3 and 12. The output from the D/A converter unit is at pins 9 and 10 which are connected friom the D/A converter to the operational amplifier.

Figure 4:
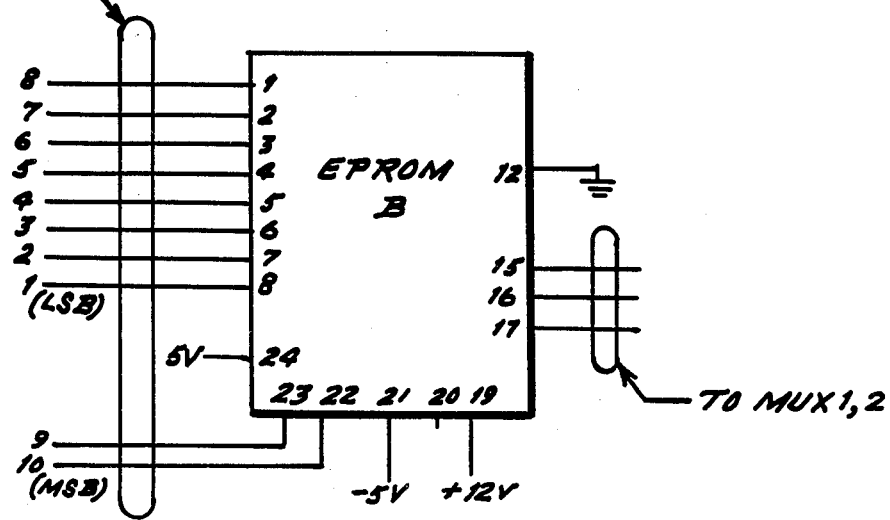
FIG. 4 is a block diagram of the EPROM B unit showing the input, output and power connections.
Figure 6:
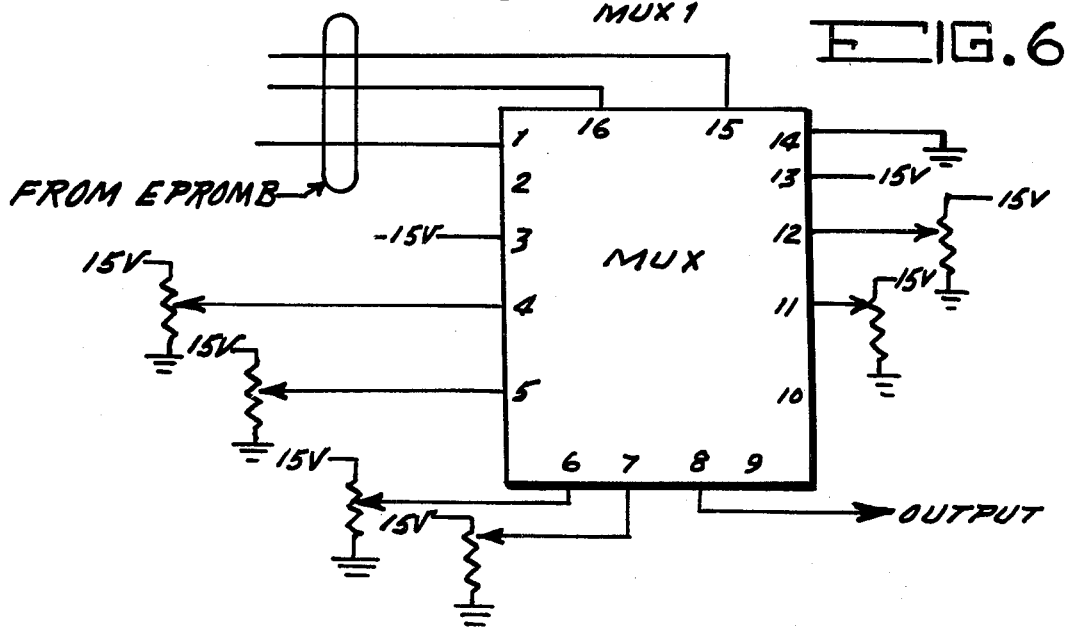

There is shown in FIG. 4 a block diagram of the EPROM B unit wherein output pins 17, 16 and 15 are connected to multiplexer input pins 15,16 and 1 respectively. Note, both multiplexer units are represented by the block diagram shown in FIG. 6, have the same inputs from the EPROM B unit. The EPROM B unit has the same input and power connections as shown for EPROM A unit in FIG. 3. The multiplexers units are powered by 15 V at pin 13, 0 V at pin 14 and −14 V at pin 3. Pins 4 through 7, 11 and 12 are connected between 15 volts and ground by 20K ohm trimming potentiometers. The output of the multiplexer unit is taken at pin 8. Pin 8 of multiplexer 1 goes to pin 5 of the D/A converter unit and pin 8 of multiplexer 2 is tied to the operational amplifier and through a resistor. All resistors which are shown in FIG. 1 are equal at a nominal 10K ohms.

Although the invention has been described with reference to a particular embodiment, it will be understood to those skilled in the art that the invention is capable of a variety of alternative embodiments within the spirit and scope of the appended claims.

What is claimed is:

1. A programmable digital temperature controller apparatus comprising in combination:
    coding means for generating a binary word, said binary word comprising a plurality binary digits, said plurality of binary digits representing a preselected temperature,
    first and second read only memory units to simultaneous receive said binary word from said coding means, said first and second read only memory units storing a plurality of digital words, said digital words stored in said first read only memory represent temperature sequences within the temperature range of said controller apparatus and each of said digital words stored in said second read only memory represents a control signal for controlling the voltage per bit level in a D/A converter and a starting voltage for a given temperature range, said first and second read only memory units each respectively providing one of said plurality of digital words as an output signal in response to said binary code, a D/A converter unit to receive said output signal from said first read only memory unit, said D/A converter unit converting said output signal to a voltage signal, a first multiplexer unit receiving said output signal from said second read only memory unit, said first multiplexer unit providing a control signal in response to said output signal, said first multiplexer unit applying said control signal to said D/A converter unit to control the voltage level per bit in said D/A converter unit, a second multiplexer unit receiving said output signal from said second read only memory unit, said second multiplexer unit providing a starting voltage for a given temperature range in response to said output signal, a first operational amplifier receiving said voltage signal from said D/A converter unit, said first operational amplifier providing said voltage signal as an output, a summing means receiving said starting voltage from said second multiplexer unit and said voltage signal from said first operational amplifier, said summing means summing said starting voltage and said voltage signal to provide a voltage output signal, and, a second operational amplifier receiving said voltage output signal, said second operational amplifier providing said voltage output signal as an output, said voltage output signal representing said preselected temperature.

2. A programmable digital temperature controller apparatus as described in claim 1 wherein said binary word comprises a byte.

3. A programmable digital temperature controller apparatus as described in claim 1 wherein said first and second read only memory units are programmable.

4. A programmable digital temperature controller apparatus as described in claim 3 wherein said first and second read only memory units are erasable.

5. A programmable digital temperature controller apparatus as described in claim 1 wherein said coding means comprises a pair of four bit binary coded decimal generator units and a two bit, three position two level switching unit.

6. A programmable digital temperature controller apparatus as described in claim 2 wherein said byte comprises ten bits.

* * * * *